UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

CATALYST AND METHOD OF PREPARING THE SAME.

1,425,576.     Specification of Letters Patent.    Patented Aug. 15, 1922.

No Drawing.     Application filed May 8, 1920. Serial No. 380,002.

*To all whom it may concern:*

Be it known that I, JOHN COLLINS CLANCY, a subject of the King of Great Britain, residing at Providence, in the county of Providence and State of Rhode Island, have invented certain new and useful Improvements in Catalysts and Methods of Preparing the Same, of which the following is a specification.

This invention comprises, as a new article of manufacture, a metal of the type including silver and copper, in a highly expanded and porous but coherent form; and the method by which the said product may be prepared. The metals or metallic residues obtained in accordance with this invention are highly active catalysts, and are useful in connection with numerous reactions, including for example the preferential combustion of carbon monoxid in presence of hydrogen by reaction with steam; the formation of nitrogen oxids by oxidation of ammonia in presence of air; the preparation of formaldehyde by limited oxidation of methyl alcohol or methane, etc.

According to my invention silver or copper cyanamid, or a mixture of these salts, is first prepared, preferably in the wet way and in accordance with the now known methods, by precipitating a dissolved cyanamid by the appropriate metal salt or salts, such for example as silver nitrate, cupric chlorid, or mixtures thereof. The resulting precipitate, which is yellow in the case of silver cyanamid or black in the case of copper cyanamid, is washed and dried and thereafter heated under oxidizing conditions to the decomposing temperature.

I have found that these salts when moderately heated, say to 250—350° C., in presence of air undergo sudden decomposition, the reaction presenting some of the characteristics of an explosion, with the result that the precipitate suddenly expands or "pops" with great increase in volume. The resulting highly expanded product appears to consist largely or entirely of a metallic residue which is extremely light and porous, is readily traversed by gases, but is nevertheless sufficiently coherent to permit its employment as a catalyst for various gas reactions without the necessity of associating it with a pumice or other inert support of filler; although such extraneous mixtures may of course be used if desired. The residues derived from silver and copper cyanamids may be used individually, but I prefer as a rule to employ mixtures of the two, either in approximately equal or in molecular proportions, since I have found that thereby a product of increased catalytic activity is obtained.

The nature of the reaction occurring in the course of the above described transformation is not now certainly known; but it is regarded as probable that nitrides of silver and copper may be formed as initial products of decomposition of the cyanamid, and that their subsequent decomposition may give rise to the above described explosive effect.

A convenient way of practicing the invention consists in forming the precipitate consisting of copper or silver cyanamid, either alone or mixed with each other or with other materials, such for example as the metal-cyanogen complexes mentioned below, into small cubes, pellets or other appropriate shapes; and then charging them into a crucible and heating them in presence of air to the point where the sudden expansion or puffing occurs. By proceeding in this way I have produced aggregates which are apparently metallic in character and have an apparent specific gravity of the order of 4.6 for Cu and 5.8 for Ag residues.

As stated above, these expanded products are highly active catalysts for many reactions, although they may of course be applied to other purposes for which very finely subdivided metals or metallic aggregates are desired.

For certain catalytic purposes, as for example for the oxidation of ammonia, I prefer to incorporate with these catalysts, comprising either the silver or the copper residue or any mixtures thereof, relatively small proportions of certain cyanogen complexes which have the effect of materially enhancing the catalytic activity, and are hereinafter for simplicity designated "activating agents." The cyanogen complexes referred to are metal derivatives of the ferro- and ferri-cyanides, such for example as bismuth ferro- and ferri-cyanide; calcium cerium ferro-cyanide; cerium cobalt ferro-cyanide; vanadium ferro-cyanide; molybdenum ferro-cyanide; or the like. These complexes, when heated to moderate temperatures under oxidizing conditions are likewise convertible into highly porous masses, although they do not form highly expanded structures as do the cyanamids of silver and copper described above. By incorporating such cyanogen complexes with these cyanamids, before subjecting the latter to thermal decomposition, intimate mixtures of very high catalytic value are formed.

The invention has been described with particular reference to the metals silver and copper but, as is indicated, is applicable to all metals of the type of silver and copper. The expression "metal of the type of silver and copper" is employed to designate all metals, the cyanamids of which, like silver and copper, decompose upon the application of heat with the formation of porous catalytic metallic residues.

I claim:—

1. As a new article of manufacture, a catalytically active body comprising the product of thermal decomposition under oxidizing conditions of the cyanamids of a plurality of metals of the type of silver and copper.

2. As a new article of manufacture, a catalytically active body comprising the product of thermal decomposition under oxidizing conditions of a mixture of the cyanamids of silver and copper.

3. As a new article of manufacture, a catalytically active body comprising the product of thermal decomposition under oxidizing conditions of a cyanamid of a metal of the type of silver and copper.

4. As a new article of manufacture, a catalytically active body comprising the product of thermal decomposition under oxidizing conditions of a mixture of cyanamids of metals of the type of silver and copper in proportions corresponding to their molecular weights.

5. As a new article of manufacture, a catalytically active body comprising the product of thermal decomposition under oxidizing conditions of a mixture of the cyanamids of silver and copper in proportions corresponding to their molecular weights.

6. As a new article of manufacture, a catalytically active body comprising the product of thermal decomposition under oxidizing conditions of a cyanamid of a metal of the type of silver and copper in association with an activating agent.

7. As a new article of manufacture, a catalytically active body comprising the product of thermal decomposition under oxidizing conditions of a mixture of cyanamids of metals of the type of silver and copper in association with an activating agent.

8. As a new article of manufacture, a catalytically active body comprising the product of thermal decomposition under oxidizing conditions of a cyanamid of a metal of the type of silver and copper in association with an activating agent comprising a decomposition product of a metal-cyanogen complex.

9. As a new article of manufacture, a catalytically active body comprising the product of thermal decomposition under oxidizing conditions of a mixture of cyanamids of metals of the type of silver and copper in association with an activating agent comprising a decomposition product of a metal-cyanogen complex.

10. As a new article of manufacture, a highly expanded product comprising a metal of the type of silver and copper, in association with an activating agent.

11. As a new article of manufacture a highly expanded product comprising a mixture of metals of the type of silver and copper, in association with an activating agent.

12. As a new article of manufacture, a highly expanded product comprising a metal of the type of silver and copper, in association with an activating agent comprising a decomposition product of a metal-cyanogen complex.

13. As new article of manufacture, a highly expanded product comprising a mixture of metals of the type of silver and copper, in association with an activating agent comprising a decomposition product of a metal-cyanogen complex.

14. As a new article of manufacture, a highly expanded coherent product comprising a metal of the type of silver and copper, said product having the essential characteristics of the product of thermal decomposition of a metallic cyanamid under oxidizing conditions.

15. As a new article of manufacture, a highly expanded coherent product comprising a mixture of metals of the type of silver and copper, said product having the essential characteristics of the product of thermal decomposition of a metallic cyanamid.

16. Method of preparing a product having catalytic activity, comprising subjecting a cyanamid of a metal of the type of silver and copper to thermal decomposition under oxidizing conditions.

17. Method of preparing a product having catalytic activity, comprising subjecting a cyanamid of a metal of the type of silver and copper, associated with a metal-cyanogen complex, to thermal decomposition under oxidizing conditions.

18. Method of preparing a product having catalytic activity, comprising subjecting a mixture of cyanamids of metal of the type of silver and copper, associated with a metal-cyanogen complex, to thermal decomposition under oxidizing conditions.

In testimony whereof, I affix my signature.

JOHN COLLINS CLANCY.